Aug. 20, 1963 C. R. ADAMS 3,101,224
HIGH LOAD HYDROSTATIC BEARING
Filed Sept. 12, 1960 4 Sheets-Sheet 1
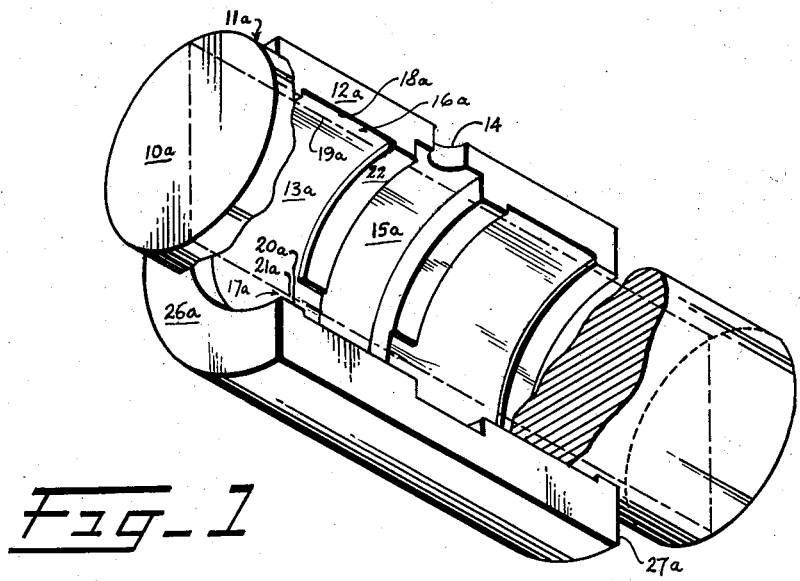
Fig_1
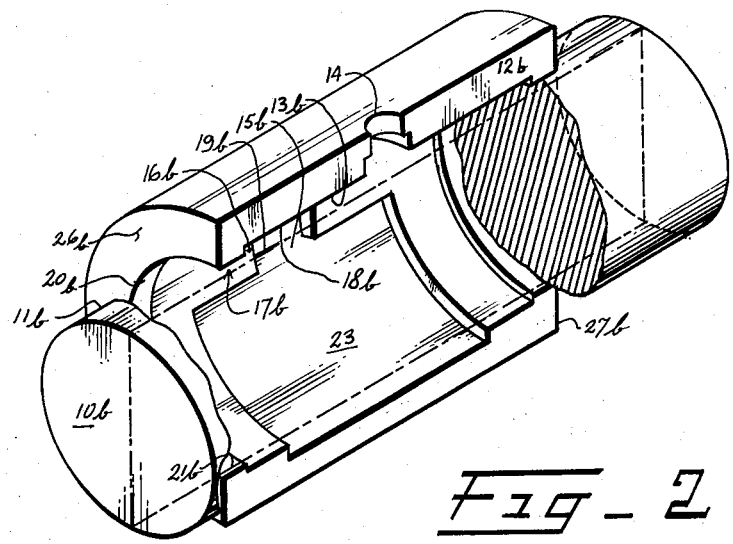
Fig_2
INVENTOR.
CLARENCE R. ADAMS
BY
T. H. Nichols
AGENT INVENTOR.
CLARENCE R. ADAMS
BY
J. W. Nichols
AGENT Aug. 20, 1963

C. R. ADAMS 3,101,224

HIGH LOAD HYDROSTATIC BEARING

Filed Sept. 12, 1960

INVENTOR.
CLARENCE R. ADAMS
BY J. R. Nichols
AGENT

Aug. 20, 1963  C. R. ADAMS  3,101,224
HIGH LOAD HYDROSTATIC BEARING
Filed Sept. 12, 1960  4 Sheets—Sheet 4
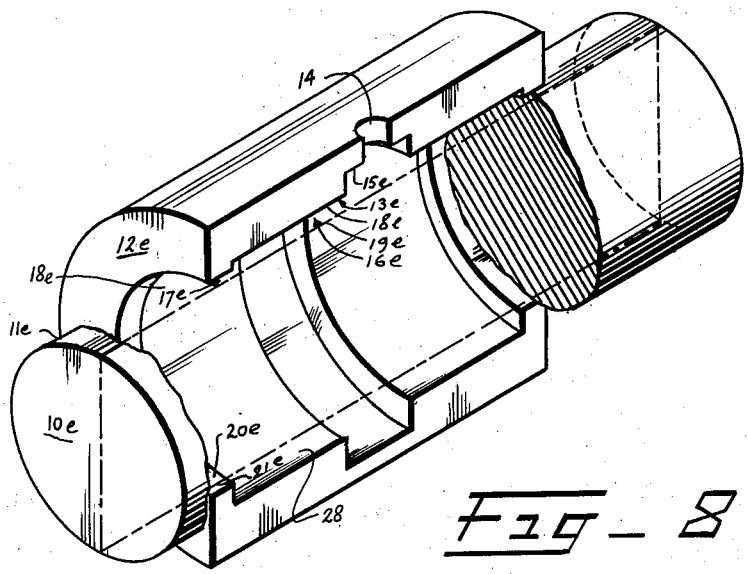
INVENTOR.
CLARENCE R. ADAMS
BY T. H. Nichols
AGENT United States Patent Office 3,101,224
Patented Aug. 20, 1963

3,101,224
HIGH LOAD HYDROSTATIC BEARING
Clarence R. Adams, Kirkland, Wash., assignor to Boeing Airplane Company, Seattle, Wash., a corporation of Delaware
Filed Sept. 12, 1960, Ser. No. 55,574
16 Claims. (Cl. 308—122)

This invention pertains to high load pneumatic hydrostatic or fluid bearings, often referred to as "air bearings" wherein a movable body is supported by a fluid under high pressure. This is a continuation-in-part of my application, Serial Number 781,326, filed December 18, 1958, now abandoned.

More particularly, this invention comprises a hydrostatic bearing of the step type disclosed in the above identified application which has two pairs of bearing surfaces, the radial clearance between the first pair of bearing surfaces being greater than that between the second pair. The bearing disclosed herein is one designed for supporting higher loads on the bearing. This bearing includes a device for generating an increased pressure between the highly loaded portions of the bearing surfaces. This increased pressure enables the bearing surfaces to support the load and to maintain at least one pair of bearing surfaces concentric and evenly spaced from each other while operating under the high load.

In all prior fluid supported bearings, no means are provided for supporting high loads on the bearings and, at the same time, for maintaining the bearings concentric or equally spaced from each other to prevent rubbing and scoring.

Heretofore, when a load is applied to a shaft rotatably mounted in a housing and supported therein by fluid under pressure between the shaft and its housing, the shaft is displaced in its housing in the direction of the application of the load until the displacing force is balanced, if possible, by the increase in pressure, or until the shaft rubs against its housing causing scoring of the bearing surfaces therebetween. In any event as is obvious, greater leakage of fluid results with increased load and pressure.

A principal object of the disclosed fluid or hydrostatic bearing is to provide a bearing that will support higher loads than obtainable heretofore without increasing leakage.

Another object of this invention is to provide a hydrostatic bearing that will support heavy loads while simultaneously maintaining at least one pair of bearing surfaces between the shaft and its housing concentric at all times, or maintaining the shaft in a concentric position within the housing while under load.

A further object of this invention is the provision of a hydrostatic bearing having two pairs of bearing surfaces, the radial clearance between the bearing surfaces of the first pair being greater than the radial clearance between the second pair, and fluid pressure generating means for increasing the pressure between portions of the bearing surfaces for supporting high loads and for maintaining the bearing surfaces of at least one pair concentric while under load without increasing leakage.

Other objects and various advantages of the disclosed high load hydrostatic bearing will be apparent from the following detail description, together with the accompanying drawings, submitted for purposes of illustration only and not intended to define the scope of the invention, reference being had for that purpose to the subjoined claims.

Briefly, this invention comprises a fluid or hydrostatic bearing having two pairs of bearing surfaces with a step therebetween wherein the radial clearance between the bearing surfaces of the first pair is greater than the radial clearance between the bearing surfaces of the second pair, this much of which is disclosed in the above identified prior patent application. The instant bearing is an improved bearing which comprises also a fluid pressure generating means for genertating additional fluid pressure in the portion of the bearings supporting the greater part of the load whereby the bearing surfaces of at least one of the pairs of bearing surfaces are maintained equally spaced from each other and concentric while under load.

The drawings diagrammatically illustrate by way of example, not by way of limitation, one form of the invention wherein like reference numerals designate corresponding parts in the several views in which:

FIG. 1 is a vertical cross sectional isometric view of one embodiment of the high load step bearing;

FIG. 2 is a vertical cross sectional isometric view of a modification of FIG. 1;

FIG. 8 is a vertical cross sectional isometric view of another modification of FIG. 1.

Figure 3:
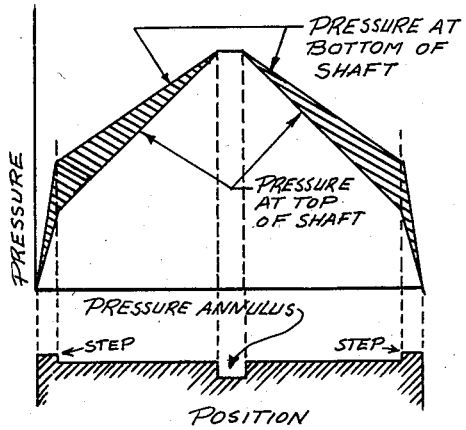
FIG. 3 is a load capacity pressure diagram illustrating the pressure distribution at the top and bottom of a step bearing utilizing a constant width supply pressure annulus without a supplemental fluid pressure generating means.

The invention disclosed herein is not limited in its application to the method and details of construction and arrangement of parts shown and described, since the invention is capable of other embodiments and of being practiced or carried out in various other ways. Also, it is to be understood that the phraseology or terminology employed herein is for the purpose of description and not of limitation.

The high load hydrostatic bearing or "air bearing" disclosed may be utilized in various configurations and in many forms. Various apparatuses embodying the teachings of the instant invention are disclosed herein. For ease of disclosure, the bearings are here shown and disclosed as the operating or contiguous surfaces between a shaft rotatably mounted in a housing, the bearing surfaces being the outer peripheral surface of the shaft adjacent the housing and the inner peripheral surface of the housing adjacent the shaft.

FIG. 1 discloses an embodiment of the invention wherein the shaft 10a, having an outer peripheral bearing surface 11a, is rotatably mounted in housing 12a having an inner peripheral surface 13a. A conduit 14 is formed in the housing for supplying fluid under pressure to a fluid pressure supply annulus 15a formed in the internal peripheral surface 13a of the housing. The pressurized fluid from the supply annulus 15a flows axially of the shaft between the first pair of complementary bearing surfaces 18a and 19a, which form the first larger diameter annulus 16a, and then form there to the second pair of complementary bearing surfaces 20a and 21a, which form the second smaller diameter annulus 17a, before being exhausted from the ends 26a, 27a of the housing. The axial flow of fluid from the supply annulus 15a through the elongated passageway formed between the stepped complementary bearing surfaces 18a, 19a and 20a, 21a of the housing and shaft, supports or floats the shaft in the housing.

The radial clearance between the peripheral surfaces of the shaft and housing is illustrated in FIG. 1 by the superimposition on the housing of a vertical cross section or profile shown in broken lines of the shaft.

A feature of the invention is the particular shape of the bearing surfaces for supporting high loads on the shaft and yet maintain the shaft centered in the housing, i.e., maintaining the bearing surfaces concentric with each other.

The pressure annulus 15a is positioned intermediate the ends of the housing 12a. Formed in the internal peripheral surface 13a of the housing and adjacent the pressure annulus 15a is the first annular bearing surface 18a and formed in the external peripheral surface 11a of the shaft 10a is first annular bearing surface 19a complementary to the bearing surface 18a. Likewise, a second annular bearing surface 20a adjacent the annular surface 18a is also formed on the inner peripheral surface 13a of the housing and a second annular bearing surface 21a adjacent the annular surface 19a is also formed on the outer peripheral surface 11a of the shaft.

Accordingly, the first pair of complementary bearing surfaces 18a and 19a define the first annular space, or annulus 16a, and the second pair of complementary bearing surfaces 20a and 21a define the second annular space, or annulus 17a, for receiving fluid under pressure from the pressure annulus 15a. To provide step bearings, a step is formed between the two housing bearing surfaces 18a and 20a, so that the diameter of the housing first bearing surface 18a is greater than the diameter of the housing second bearing surface 20a. Accordingly, the radial clearance between the housing first bearing surface 18a and the shaft first bearing surface 19a is greater than the radial clearance between the housing second bearing surface 20a and the shaft second bearing surface 21a, whereby the radius of the first annulus 16a is greater than the radius of the second annulus 17a and the mean radius of one pair of bearing surfaces, as 18a and 19a is greater than the mean radius of the other pair of bearing surfaces, as 20a and 21a. This much of the hydrostatic bearing is disclosed in the above described parent case.

A principal feature of the disclosed hydrostatic bearing is the fluid pressure generating means formed in the bearing surface to maintain the circular or annular bearing surfaces of the housing concentric with the complementary bearing surfaces of the shaft.

In the embodiment of FIG. 1, a semicircular annulus or ridge 22 is formed in the top half of the housing first bearing surface in juxtaposition with the fluid pressure supply annulus 15a.

This ridge may be described as a pressure sustaining means, a pressure differential generating means, or merely a pressure generating means, means for slowing down or retarding the axial flow of fluid from the supply annulus 15a to the upper portion of the first annulus 16a, while the fluid is unrestrained in its flow to the lower portion of the annulus thereby providing a pressure differential between the upper and lower portions of the bearing.

While only one side of the hydrostatic bearing may be utilized and has been described in detail, the other side may also be used and is shown as the allochiral duplication of the first side. Obviously if desired, only one side of the bearing may be utilized by blocking off the other side.

In operation of the disclosed hydrostatic bearing, fluid such as air under pressure is supplied from the conduit 14, FIG. 1 for example, to the pressure annulus 15a, from which annulus the high pressure fluid is ejected peripherally and axially of the shaft to the larger diameter annulus 16a. From thence the pressure fluid flows to the smaller diameter annulus 17a before being exhausted from the housing ends 26, 27. As fluid flows between the first bearing surfaces 18a and 19a of the housing and shaft, respectively, and between second bearing surfaces 20a and 21a also of the housing and shaft, respectively, the shaft is freely supported by the fluid pressure which tends to center the shaft in the housing or tends to maintain the housing bearing surfaces concentric with the shaft bearing surfaces. This is the principle of normal operation of the hydrostatic bearing wherein any radial translation of the shaft in the housing is restrained by an increase in pressure on the side of the shaft nearest the housing. While the shaft is resisted from actually striking the housing as a result of any load or external force on the shaft relative to the housing, the shaft will normally operate off to one side in the direction of the force applied and is accordingly more vulnerable to scoring due to contact. The result is that the bearing surfaces 18a and 20a of the housing are nonsymmetrical and nonconcentric with the respective complementary bearing surfaces 19a and 21a of the shaft.

The embodiment of FIG. 1, as illustrated, as well as the other embodiments is designed to resist forces or loads in the downward direction.

Accordingly, in operaton of the embodiment of FIG. 1, pressure builds up in the lower portion of the first annulus 16a relative to the upper annulus portion i.e., the fluid pressure is caused to be higher in the lower half portion of the annulus 16a than the fluid pressure in the top portion of the annulus due to the unrestrained free flow of fluid into the lower half. The flow of fluid to the upper half of the annulus is slowed or retarded by the semiannular ride 22, and due to the resultant expansion of the fluid in the annulus downstream of the restriction, whereby the increased loads or downward forces on the shaft are resisted and supported. In addition, the disclosed hydrostatic bearing provides, with no increase in bearing leakage, an increased load bearing capacity; and, in fact, an actual decrease in bearing leakage results. Also, the complementary bearings are maintained concentric.

FIG. 2 discloses a modification of the high load hydrostatic bearing of FIG. 1, wherein a similar peripheral surface 11b of shaft 10b has first and second bearing surfaces 19b and 21b complementary to the respective first and second bearing surfaces 18b and 20b of the inner peripheral surface 13b of a housing 12b. The radial clearance between the peripheral surfaces of the shaft and housing is illustrated in FIG. 2 by the superimposition on the housing of a vertical cross section or profile of the shaft shown in broken lines. The fluid pressure supply annulus 15b is provided with fluid from the conduit 14 for ejecting fluid under pressure to the first annular space 16b between the first complementary bearing surfaces 18b and 19b of the housing and shaft, respectively. The pressure fluid then passes into the second annular space 17b between the complementary bearing surfaces 20b and 21b of the housing and shaft prior to being expelled from the ends 26b and 27b of the housing. A feature of this modification is the fluid pressure supply annulus 15b which is formed wider in the lower half 23 of the housing bearing 18b to form a pressure generating means.

In operation of the modification of FIG. 2, fluid is admitted to the pressure annulus 15b from the supply conduit 14 and is distributed to the first annulus 16b. Because the lower portion of the pressure annulus 15b is formed wider than the upper portion, as by milling or the like, a greater amount of area under the shaft is exposed to the high pressure fluid in the pressure annulus. Likewise, the point where pressure drop occurs is positioned farther from the center of the source of fluid pressure in the lower portion of the housing first bearing surface 18b than in the upper position thereof. Thus a higher pressure is maintained in the lower portion of the annulus 16b between the complementary bearing surfaces 18b and 19b than in the upper portion of the annulus. Accordingly another high load hydrostatic step bearing is provided with capabilities of supporting heavy loads on the shaft and yet maintain the bearings concentric while under load.

Figure 4:
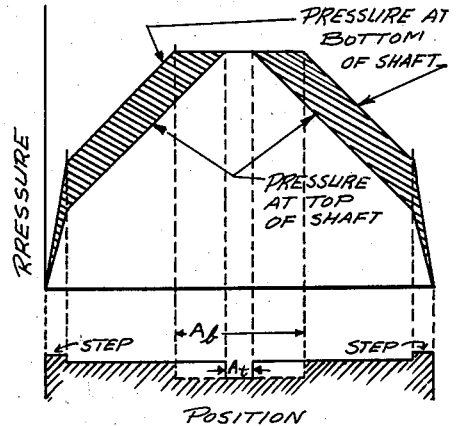
FIG. 4 is a pressure diagram similar to FIG. 3 wherein the pressure annulus is enlarged at the bottom illustrating the increased load capacity for an exemplary embodiment of the invention, as that of FIGURE 2 for example.

FIGS. 3 and 4 are pressure diagrams illustrating the pressure distribution at the top and bottom of a step bearing utilizing first, a constant width fluid pressure supply annulus as disclosed in the above identified patent application, and second, a fluid pressure supply annulus having means for generating additional load supporting forces, as for example the wide bottomed pressure annulus of FIG. 2.

As illustrated in FIG. 3 on the diagram, the abscissa represents the longitudinal position beginning at the left end of the housing and traversing to the right end of the housing, and the ordinate represents the pressure between the complementary surfaces of the housing and shaft for a stepped bearing without a supplemental pressure generating means for increasing the load carrying capacity of the bearings. The top line or curve marked "pressure at bottom of shaft" illustrates exemplary pressures between the complementary housing and shaft surfaces along the bottom of the shaft from a point at the lower left end of the housing longitudinally to the right to a point at the lower right end of the housing. The lower line or curve marked "pressure at top of shaft" illustrates the corresponding pressure between the complementary housing and shaft surfaces along the top of the shaft from a point at the upper left end of the housing longitudinally to the right to a point at the upper right end of the housing.

FIG. 4 illustrates a pressure diagram for an exemplary embodiment of the invention, as that of FIG. 2 for example, in which the abscissa is the longitudinal position of a point from the left end of the housing of FIG. 2 to the right end of the housing; and the ordinate is the pressure between the complementary surfaces of the housing and shaft. Similar to FIG. 3, the top line or curve identified by "pressure at bottom of shaft" of FIG. 4 illustrates exemplary pressures between the complementary housing and shaft surfaces along the bottom of the shaft from the lower left end of the housing longitudinally to the lower right end of the housing; and the lower line or curve identified by "pressure at top of shaft" illustrates the corresponding pressure between the complementary housing and shaft surfaces along the top of the shaft from the upper left end of the housing longitudinally to the upper right end of the housing. The distance "$A_b$" indicates the width of the annulus 15 at the bottom thereof, while the distance "$A_t$" indicates the width of the top of the annulus 15. The shaded area indicates the pressure differential or lift generated to resist the load on the shaft. Here the great advantages and features are shown for a stepped bearing having a supplemental pressure generating means for making a high load capacity hydrostatic bearing.

Figure 5:
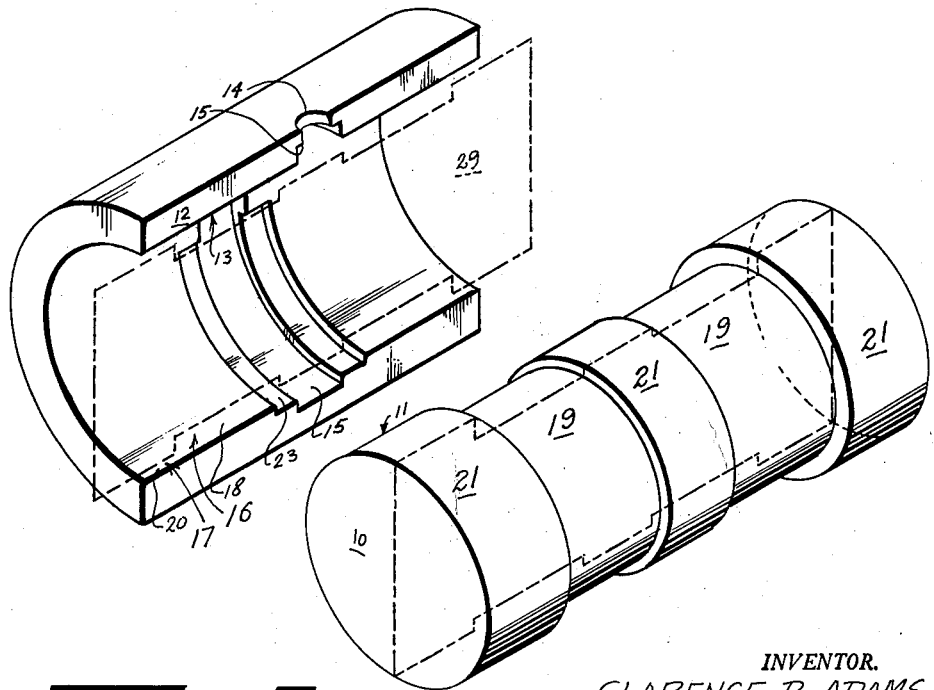
FIG. 5 is a vertical cross sectional isometric view of another embodiment of the invention combining the features of the modifications of FIGS. 1 and 2.

The embodiment of FIG. 5 includes a shaft 10 having a peripheral surface 11 and is rotatably mounted in a housing 12. The housing has a pressure fluid supply annulus 15 and supply conduit 14 similar to those of FIG. 1. In this embodiment, the bearing surfaces 11 are formed or cut out only on the shaft outer peripheral surface instead of being formed in or cut out of the housing inner peripheral surface. The radial clearance between the peripheral surfaces of the shaft and housing is illustrated in FIG. 5 by the superimposition of a vertical cross section of profile 29 of the shaft shown in dotted lines on the vertical section of the housing. Peripheral surface 11 of the shaft comprises three similar steps or bearing surfaces 21 of increased radii over the radii of the surfaces 19. Center bearing surface 21 is formed of decreased radius as compared to the radii of the outer surfaces 21 to ensure the prevention of "hydraulic locking" such that pressure fluid flow may never be stopped due to contact of the shaft with the housing. The inner peripheral surface 13 of the housing 12 comprises a first bearing surface 18 immediately opposite to the shaft center bearing surface 21 and a second bearing surface 20 immediately opposite to an end bearing surface 21. A principal feature of this modification is the differential pressure generating means or the semi-circular cutout or semicircular pressure passage 23 in the embodiment of FIG. 5 formed in the lower portion of the housing first bearing surface 18 opposite the shaft center bearing surface 21, the passage being of a greater longitudinal length than the length of center bearing surface 21. Step cutout forming passage 23 may be of any desired depth up to the depth of the annulus 15. Pressure fluid can then pass from the supply annulus 15 to the first annulus 16 formed by the upper and lower bearing portions of bearing surfaces 19 and 18 of the respective peripheral surfaces 11 and 13 of the shaft and housing, respectively. However, due to the semicircular pressure passage 23 in the lower portion of the housing, added pressure fluid is supplied to the lower bearing portions of the first annulus 16 and the pressure is increased therein as compared to the pressure in the upper bearing portions of the first annulus. While the pressure fluid thus flows from supply annulus 15 to the first annulus 16, and then to the second annulus 17 formed by the bearing surfaces 20 and 21, additional pressure and force are generated in the lower portion of the first annulus due to the pressure generating means 23. This increased pressure build-up on the bottom of the bearing, as clearly illustrated in FIG. 4, provides the increased load capacity of the bearing.

Figure 6:
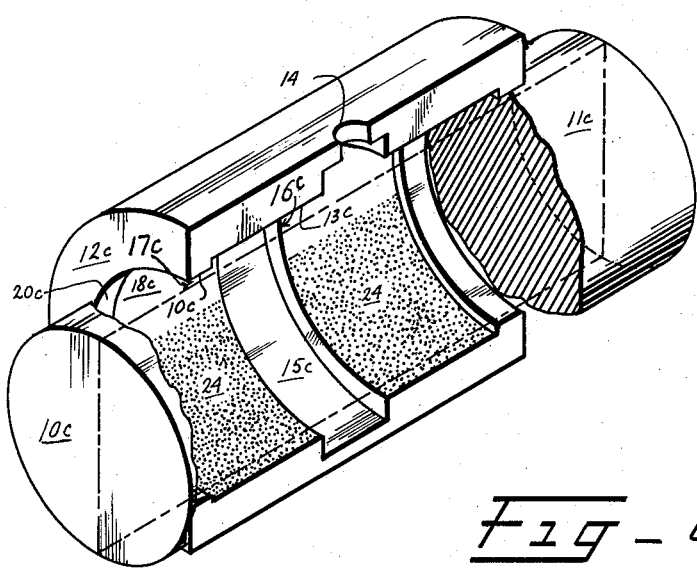
FIG. 6 is a vertical cross sectional isometric view of another modification of FIG. 1.

FIG. 6 discloses a high load hydrostatic bearing comprising a shaft 10c having a peripheral surface 11c rotatably mounted in a housing 12c having a fluid pressure supply annulus 15c, supply conduit 14, and an inner peripheral surface 13c, the latter housing surface having a first bearing surface 18c of greater radius of curvature than a second bearing surface 20c. Housing first and second bearing surfaces 18c and 20c have complementary first and second surfaces in the shaft peripheral surface 11c. The radial clearance between the peripheral surfaces of the shaft and housing is illustrated in FIG. 6 by the superimposition on the housing of a vertical cross section or profile of the shaft shown in broken lines. A feature of this modification is the forming of a rough surface 24 as by sandblasting, etching, or the like, in the lower half of the first bearing surface 18c.

For operation of the modification of FIG. 6, fluid from annulus 15c supplied by conduit 14 is supplied to the space between the first complementary bearing surfaces and then passed to the space between the second complementary bearing surfaces before being exhausted. Turbulent flow of the fluid caused by the rough area 24 produces a higher static pressure in the under portion of the shaft relative to the upper portion of the shaft which has laminar flow. Accordingly, another high load hydrostatic bearing is provided with capabilities of supporting high loads or forces on the shaft, and yet the bearings are maintained concentric to prevent inadvertent contact and scoring.

Figure 7:
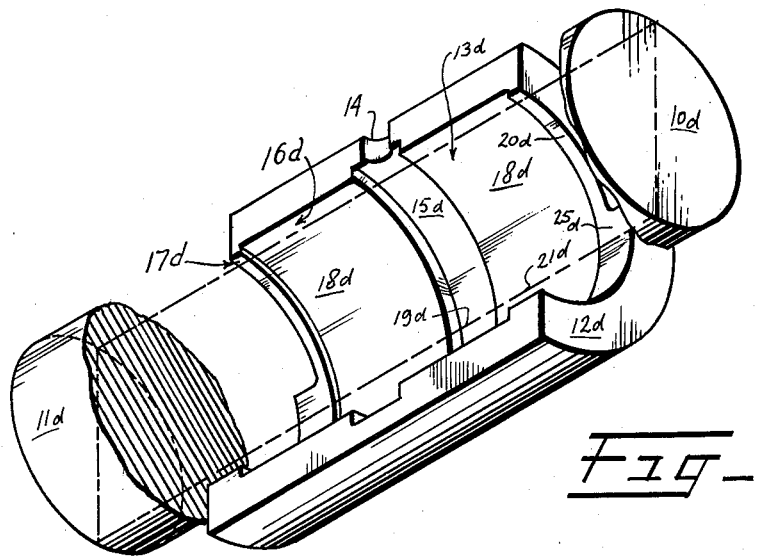
FIG. 7 is a vertical cross sectional isometric view of further modification of FIG. 1.

Another modification of the high load hydrostatic bearing is disclosed in the embodiment of FIG. 7, wherein the shaft 10d having a peripheral surface 11d is rotatably mounted in a housing 12d having a peripheral surface 13d. The latter surface comprises a first bearing surface 18d and a second bearing surface 20d. A high pressure fluid conduit 14 and annulus 15d supply high pressure fluid to the bearing surfaces. The shaft peripheral surface 11d comprises first and second bearing surfaces 19d and 21d, respectively, which are complementary to the housing bearing surfaces 18d and 20d. The radial clearance between the peripheral surfaces of the shaft and housing is illustrated in FIG. 7 by the superimposition on the housing of a vertical cross section or profile of the shaft shown in broken lines. A feature of this modification is the axial widening of the lower simicircular portion 25d of the housing second bearing surface 20d by a substantial amount to form a pressure generating means.

Accordingly, in operation of the modification of FIG. 7, fluid under pressure is admitted to the annular space between the first complementary bearing surfaces, 18d and 19d, from supply annulus 15d and then admitted to the annular space between the second complementary bearing surfaces 20d and 21d. Due to the increased bearing surface area 25d in the lower portion thereof and increased resistance to exit flow of the bearing fluid, the pressure increases in the lower portion of the annulus between the first complementary bearing surfaces compared to the pressure in the upper portion of the annulus. Thus another high load hydrostatic bearing is provided with capabilities of supporting high loads or forces on the shaft and still the bearings are maintained concentric.

FIG. 8 discloses another modification of the high load hydrostatic bearing comprising a shaft 10e having a peripheral surface 11e rotatably mounted in a housing 12e having a peripheral surface 13e, high pressure supply fluid annulus 15e, and a fluid supply conduit 14. A pair of complementary bearing surfaces 18e and 19e on the peripheral surfaces of the housing and shaft, respectively, are spaced apart to provide an annular space or first annulus 16e therebetween for the passage of the pressure fluid. The radial clearance between the peripheral surfaces of the shaft and housing is illustrated in FIG. 8 by the superimposition on the housing of a vertical cross section of profile of the shaft shown in broken lines. Likewise, a pair of complementary bearing surfaces 20e and 21e on the peripheral surfaces of the housing and shaft, respectively, are concentric and spaced apart to provide an annular space or second annulus 17e for the lubricating pressure fluid to pass.

A feature of this modification is the hollowing out or recessing of the lower half of the housing first bearing surface 18e, to provide an enlarged or deepened eccentric area or recess 28 or pressure generating means in the lower half of the first annulus 16e. As fluid flows into the first annulus 16e from the supply annulus 15e, there is less resistance to flow into the lower portion of the first annulus thereby causing a pressure build-up or increase at the bottom of the first bearing surfaces. The lower enlarged bearing portion 23 of the first bearing surface 18e may be of various shapes. If the top half of the bearing surface 18e is cylindrical and the bottom half 28 elliptical or parabolic for example, the cylindrical bearing surfaced shaft 10e is maintained concentric with both the housing second bearing surface 20e and the cylindrical or top half of the housing first bearing surface. A preferred embodiment is a cylindrical housing bearing surface 18e of greater radius than that of the shaft cylindrical surface whereby the eccentric positioning of the shaft in the upper portion of the housing first bearing surface provides the enlarged area for causing the pressure increase therein for maintaining the shaft and housing second bearing surfaces concentric. In operation, due to the increased pressure generated by the hollowed-out portion 28 in the housing first bearing surface, the shaft load is equalized to the extent that the second bearing surfaces 20e and 21e are maintained concentric for prevention of rubbing and scoring of the bearing surfaces.

As is obvious, there are advantages for forming the step bearings in either the shaft or housing peripheral surfaces, depending on the requirements of the desired design. In most casees, machining of the step in the shaft outer surface is easier and more economical as shown by the modification of FIG. 5. Nevertheless, cutting the step in the housing is the preferred method since shaft longitudinal reciprocation in the housing is then permitted.

While the usual lubricant in the disclosed hydrostatic bearings is air, other suitable fluids may be supplied under pressure as oil, water, etc., depending on the requirements of the bearing.

While the load has been described as being placed on the shaft, obviously the housing may be utilized to support the load relative to the shaft if so desired.

Further, the above disclosed embodiments are illustrated to support a high load in the downward vertical direction by positioning the fluid pressure generating means at the bottom. Obviously for loads applied in any other direction the pressure generating means may be formed in the bearing surface opposite the side of application of the load.

While the second pair of complementary bearing surfaces are shown having a substantial length in a direction longitudinally of the shaft axis, this length may be very small as compared to the length of the first complementary bearing surfaces, as long as the step is present between the two, i.e., the radius of first bearing surfaces being greater than that of the second bearing surfaces.

In summary, a new hydrostatic bearing is set forth comprising a shaft rotatable in a housing wherein various means have been disclosed for generating additional fluid pressure in the lower half of the annulus between the shaft and housing for supporting greater loads than ever obtainable before. This new hydrostatic bearing has the capability of supporting a heavy load on the shaft and yet due to the pressure generating means in the bearing surface, at least one pair of bearing surfaces is maintained concentric with each other. Due to the various pressure generating means being formed in the surface of each of the above disclosed bearings, several simple, economical, and fool-proof high load hydrostatic bearings are provided.

While only a few embodiments of the invention have been shown in the accompanying drawings, it will be evident that various other methods and modifications are possible in the arrangement and construction of the high load hydrostatic bearing without departing from the scope of the invention.

I claim as my invention:

1. A high load hydrostatic bearing comprising the combination of:
    (a) a first body,
    (b) a second body rotatably mounted about its principal axis in said first body and adapted to receive a heavy load,
    (c) said bodies having complementary bearing surfaces,
    (d) said complementary bearing surfaces defining a first annulus, said bearing surfaces of said first annulus having a constant radial clearance,
    (e) means for supplying fluid under pressure to said first annulus in an axial direction of said second body,
    (f) said complementary bearing surfaces defining a second annulus, said second annulus adapted to receive fluid under pressure from said first annulus,
    (g) one of said annuli comprising two portions,
    (h) differential pressure generating means, said differential pressure generating means comprising a part of the bearing surface defining one of said portions for generating a higher pressure in one of said portions relative to the other portion for supporting the load and for maintaining the bearing surfaces that define at least one of said annuli concentric while under load, and
    (i) said differential pressure generating means being primarily responsive to the axial movement of said fluid from said fluid supply means for generating said higher pressure.

2. In a high load hydrostatic bearing the combination comprising:
    (a) a first annulus defined by a first pair of bearing surfaces having a constant radial clearance,
    (b) a second annulus defined by a second pair of bearing surfaces having a constant radial clearance wherein the radial clearance in said first pair is greater than the radial clearance in said second pair, both said annuli being adapted to receive high pressure fluid,
    (c) one of said annuli consisting of two portions, said one annulus being adapted to receive a load tending to move the bearing surfaces defining one of said portions closer together and tending to move at least one pair of bearing surfaces out of concentricity,
    (d) pressure fluid supply means, said pressure fluid supply means comprising a third annulus for supplying fluid under pressure to said annuli, and
    (e) a differential pressure generating means, said differential pressure generating means comprising one of said bearing surfaces, (f) said differential pressure generating means comprising means for generating a higher pressure in one of said annulus portions relative to the other portion for supporting the load and for maintaining the bearing surfaces that define at least one of the annuli concentric while under load.

3. A hydrostatic bearing for supporting heavy loads comprising the combination of:
(a) housing means, said housing means having an internal working surface,
(b) shaft means rotatably mounted about its principal axis in said housing means and adapted to receive the heavy loads, said shaft means having an external working surface operable in said internal working surface, each of said working surfaces comprising two bearing surfaces,
(c) the two bearing surfaces of one working surface being radially offset from each other, the two bearing surfaces of the other working surface being complementary to said first mentioned bearing surfaces whereby two pairs of complementary bearing surfaces are defined between said housing internal working surface and said shaft means external working surface,
(d) means for supplying fluid under pressure in a direction axial of said shaft between said complementary bearing surfaces of each pair, said means for supplying fluid pressure comprising an annulus around the shaft means, one pair of complementary bearing surfaces consisting of two portions, and
(e) differential pressure generating means formed in one of said latter bearing surfaces,
(f) said differential pressure generating means comprising means for generating a higher pressure on one of said portions relative to the other portion for supporting the heavy loads and for maintaining the bearing surfaces of at least one pair concentric while under load,
(g) said differential pressure generating means being primarily responsive to the axial movement of said fluid from said fluid supply means for generating said higher pressure.

4. A hydrostatic bearing for supporting heavy loads comprising the combination of:
(a) housing means, said housing means having an internal face,
(b) shaft means rotatably mounted in said housing means and adapted to receive the heavy loads,
(c) said shaft means having an external face operable with said housing internal face, each of said faces comprising two bearing surfaces,
(d) the two bearing surfaces of one face being radially offset from each other to define with the bearing surfaces of said second face two annuli of different radii,
(e) means for supplying fluid under pressure to said annuli,
(f) said pressure fluid supply means comprising a third annulus for supplying fluid under pressure to said annuli, and
(g) differential pressure generating means comprising a portion of one of the bearing surfaces, and
(h) said differential pressure generating means comprising means for generating a higher pressure in a portion of one annulus relative to the rest of said one annulus for supporting the heavy loads and for maintaining the bearing surfaces of at least one annulus concentric while under load.

5. In a high load hydrostatic bearing, the combination comprising:
(a) a housing,
(b) a shaft rotatably mounted about its principal axis in said housing and adapted to receive a heavy load,
(c) complementary bearing surfaces on said housing and said shaft, said complementary bearing surfaces defining a fluid bearing passageway,
(d) means for supplying fluid under pressure to said bearing passageway in a direction axial of said shaft, said means for supplying pressure comprising an annulus circumscribing said shaft, the radial clearance in said bearing passageway between said housing bearing surface and said shaft bearing surface over an axially extending first portion of said passageway being substantially constant,
(e) the radial clearance in said passageway between said housing bearing surface and said shaft bearing surface over an axially extending second portion of said passageway being substantially contant, said clearance of said passageway second portion being substantially less than said clearance of said passageway first portion for forming a step, and
(f) differential pressure generating means formed in a part of one of said bearing surfaces of one of said bearing passageway portions,
(g) said differential pressure generating means comprising means for generating an increased pressure in a part of one of said high load bearing passageway portions relative to the rest of said one passageway portion for maintaining the bearing surfaces of at least one of said passageway portions concentric while supporting the load, and
(h) said differential pressure generating means being primarily, responsive to the axial movement of said fluid from said fluid supply means for generating said higher pressure.

6. In a high load hydrostatic bearing, the combination comprising:
(a) housing,
(b) a shaft rotatably mounted in said housing and adapted to receive a heavy load,
(c) complementary bearing surface means between said housing and said shaft for establishing a fluid bearing passageway therebetween,
(d) means for supplying fluid under pressure through an entrance to said bearing passageway,
(e) step means in said bearing passageway being spaced intermediate the ends thereof, said step means extending circumferentially around said shaft for forming two annuli of different radii in said bearing passageway,
(f) said pressure fluid supply means comprising a third annulus for supplying fluid under pressure to said annuli,
(g) differential pressure generating means comprising a portion of said complementary bearing surface means, and
(h) said differential pressure generating means comprising means for generating an increased pressure in a part of said load bearing passageway relative to the rest of said passageway for supporting the load and for maintaining the complementary bearing surface means of at least one of the annuli concentric while under load.

7. A high load hydrostatic bearing as recited in claim 5 wherein:
(a) said differential pressure generating means comprises a substantially semicircular fluid constrictive ridge formed in said bearing passageway adjacent said pressure fluid supply means whereby a greater amount of pressure fluid is directed to a part of one of said load bearing passageway portions and restricted from the rest of said one passageway portion.

8. A high load hydrostatic bearing as recited in claim 5 wherein:
(a) said pressure fluid supply means positioned at the entrance of said bearing passageway for supplying fluid under pressure to said bearing passageway, and
(b) said differential pressure generating means comprises an enlarged portion of said annulus adjacent to one of said load bearing passageway portions for increasing the pressure in said one load bearing passageway portion whereby a pressure drop in the bearing passageway starts at a point closer to a portion of said step adjacent to said one load bearing passageway portion.

9. A high load hydrostatic bearing as recited in claim 5 wherein:
 (a) said differential pressure generating means comprises a roughened area in said bearing surface of one of said load bearing passageway portions whereby the fluid pressure is increased in a portion of said one load bearing passageway portion due to the turbulence generated therein by the roughened area.

10. A high load hydrostatic bearing as recited in claim 5 wherein:
 (a) said bearing passageway portion having the longer radius is intermediate the bearing passageway entrance and said bearing passageway portion having the shorter radius, and
 (b) said differential pressure generating means comprising an axially elongated bearing surface on the bearing surface forming the short radius portion farthest from the passageway entrance, said elongated bearing surface being adjacent said long radius bearing passageway portion whereby fluid pressure is increased in a part of said long radius load bearing passageway portion relative to the rest of said long radius load bearing passageway portion due to the increased resistance to fluid flow from a part of the short radius bearing passageway portion.

11. A high load hydrostatic bearing as recited in claim 5 wherein:
 (a) said differential pressure generating means comprises a radially deepened portion of a bearing surface,
 (b) said latter bearing surface being a part of the load bearing passageway portion whereby fluid pressure is increased in said load bearing passageway portion due to decreased resistance to fluid flow therethrough.

12. In a high load hydrostatic bearing the combination comprising:
 (a) a first annulus defined by a first pair of bearing surfaces having a constant radial clearance,
 (b) a second annulus defined by a second pair of bearing surfaces having a constant radial clearance,
 (c) one pair of bearing surfaces being radially offset from the other pair of bearing surfaces to form said two pair of annuli of different radii, both of said annuli being adapted to receive high pressure fluid in an axial direction thereof,
 (d) one of said annuli consisting of two portions, and
 (e) a differential pressure generating means, said differential pressure generating means comprising a portion of one of said bearing surfaces,
 (f) said differential pressure generating means comprising means for generating a higher pressure in one of said annulus portions relative to said other portion for supporting a high load and for maintaining the bearing surfaces that define at least one of the annuli concentric while under load, and
 (g) said differential pressure generating means being primarily responsive to the axial movement of the fluid to said annuli for generating said higher pressure.

13. In a high load hydrostatic bearing the combination comprising:
 (a) a first pair of bearing surfaces having a substantially constant radial clearance,
 (b) a second pair of bearing surfaces having a substantially constant radial clearance, the mean radii of each pair being different,
 (c) means for supplying fluid under pressure to both pairs of bearing surfaces,
 (d) said pressure fluid supply means comprising an annulus for supplying fluid under pressure to said two pairs of bearing surfaces,
 (e) one pair of bearing surfaces consisting of first and second portions, and
 (f) a differential pressure generating means, said differential pressure generating means comprising a portion of one of said bearing surfaces and comprising means for generating a higher pressure between the bearing surfaces of said first portion relative to said second portion for supporting a high load and for maintaining the bearing surfaces of at least one pair concentric while under load.

14. In a high load hydrostatic step bearing having two pairs of axially-spaced complementary bearing surfaces in which the radial clearance between one pair of complementary bearing surfaces is greater than the radial clearance between the other pair of complementary bearing surfaces as fluid flows from an annulus in an axial direction to one pair of bearing surfaces and through the other pair of bearing surfaces, the combination therewith comprising:
 (a) fluid pressure generating means on one of the bearing surfaces of the first pair of complementary bearing surfaces for generating load supporting forces and for maintaining the bearing surfaces of at least one pair concentric while under load, and
 (b) said fluid pressure generating means being primarily responsive to the axial movement of the fluid for generating said load supporting forces.

15. A high load hydrostatic step bearing comprising:
 (a) two pairs of complementary bearing surfaces in which the radial clearance between one pair of complementary bearing surfaces is greater than the radial clearance between the other pair of complementary bearing surfaces,
 (b) means for supplying fluid under pressure to both said pairs of complementary bearing surfaces,
 (c) said pressure fluid supply means comprising an annulus for supplying fluid under pressure to said two pairs of complementary bearing surfaces,
 (d) differential fluid pressure generating means in one of the bearing surfaces of said one pair of complementary bearing surfaces for generating load supporting forces and for maintaining the bearing surfaces of at least one pair concentric while under load.

16. A high load hydrostatic step bearing as recited in claim 15 wherein:
 (a) said differential fluid pressure generating means comprises a recess in a portion of one bearing surface of said first pair of complementary bearing surfaces for generating greater supporting forces between the complementary bearing surfaces of said first pair at the recess relative to the area farthest from said recess.

References Cited in the file of this patent
UNITED STATES PATENTS

| | | |
|---|---|---|
| 816,330 | Johnston | Mar. 27, 1906 |
| 2,888,878 | Cobb | June 2, 1959 |

FOREIGN PATENTS

| | | |
|---|---|---|
| 555,945 | Belgium | Apr. 15, 1957 |